Dec. 16, 1958

J. L. THOMS 2,864,424

MOTOR VEHICLE TIRE CONSTRUCTION

Filed Nov. 7, 1955

INVENTOR.
JOHN L. THOMS.
BY E.C. McRae.
J.R. Faulkner.
T.H. Oster.
ATTYS.

Dec. 16, 1958 J. L. THOMS 2,864,424
MOTOR VEHICLE TIRE CONSTRUCTION
Filed Nov. 7, 1955 2 Sheets-Sheet 2

INVENTOR.
JOHN L. THOMS.
BY E.C. McRae.
J.R. Faulkner.
J.H. Peter.
ATTYS.

United States Patent Office 2,864,424
Patented Dec. 16, 1958

2,864,424

MOTOR VEHICLE TIRE CONSTRUCTION

John L. Thoms, Birmingham, Mich., assignor to Ford Motor Company, Dearborn, Mich., a corporation of Delaware Application November 7, 1955, Serial No. 545,313

2 Claims. (Cl. 152—330)

This invention relates to a motor vehicle tire construction and more particularly to a tire construction wherein there is at least two tire members, one being an outer tire member, and one being an inner tire member. The inner tire member may be of several compositions and strengths, and preferably at least partially deflated during normal tire operation. In those instances of outer tire failure, such as punctures, lacerations, blowouts, and other road failures, this inner tire member may be inflated and the tire reusable without the ordinary tire changing operation.

In the past, in tire constructions of the prior art, in all tire failures, there was a necessity for the operator to either change the defective tire or have it changed before the vehicle could again be used. Since under many driving conditions it is difficult, if not almost impossible, to summon aid, the automobile or motor vehicle operator is required to change the tire himself. This, of course, is a very undesirable situation, in that on the changing of a tire, especially a large tire, the operator is forced to handle a substantially bulky and weighty object and maneuver it in a relatively precise manner. In the process of doing this, the operator may easily physically endanger himself by handling of this awkward object and also by exposing himself to the traffic traveling by him. In addition, the operator is usually not dressed for doing this job, which is very likely to get his clothing and person dirty and greasy. There are many road conditions that do not lend themselves to tire changing.

Also, it is a disadvantage to carry a spare tire, plus tire-changing equipment, in an automobile. In the designs of modern-day cars and body constructions, there frequently is left little space for storing of a spare tire and tire-changing equipment. It is very desirable to arrange for as much space as possible for luggage and other equipment that is carried in the automobile on pleasure and/or business trips.

It is, therefore, an object of this invention to provide a tire construction that will eliminate the necessity of the operator changing an automobile tire in case of tire failure and exposing himself to traffic hazards and physical duress and possibly injury. It is also an object of this invention to provide a tire repairing operation that does not involve the operator submitting himself to dirt and grime. A further object of this invention is to eliminate the necessity of carrying a spare tire and tire-changing equipment in the modern-day automobile, thereby providing more room for advanced body construction, luggage and equipment carrying.

A further object of this invention is to provide a tire construction that is repairable without the necessity for carrying a spare tire and wheel and tire-changing equipment, thereby eliminating weight from the motor vehicle.

Other objects and advantages of this invention will be made more apparent as this description proceeds, particularly when considered in connection with the accompanying drawings wherein:

Figure 3 is a partial cross-sectional view of another embodiment of the valve leading to the inner tire construction and the compressed air container.

Figure 1:
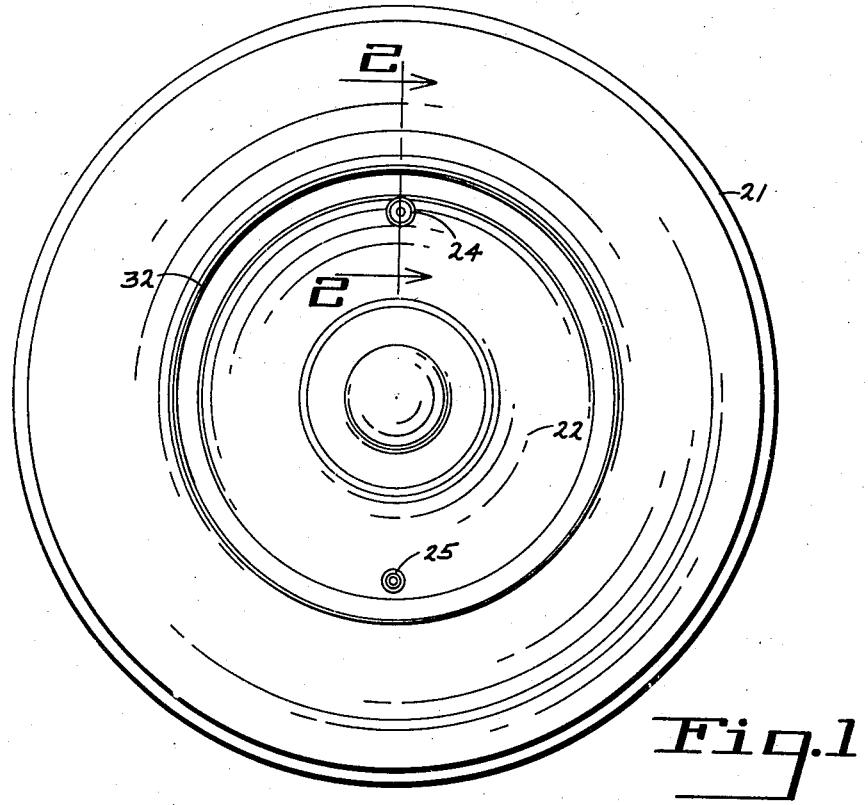
Figure 1 is a plan view of a preferred embodiment of this invention, this view showing a tire construction with a tire mounted on a wheel.

In Figure 1 the outer tire 21 is shown mounted on the wheel 22. This tire may be of any of the known tire constructions. In the wheel construction there are shown two valves, 24 and 25, which lead respectively to the inner and outer tire constructions. These valves are located on the wheel 180° from one another so that the wheel will be more evenly balanced. While there are shown only two valves and two tire members in these drawings, additional tire members may be used to advantage and come within the purview of this invention.

Figure 2:
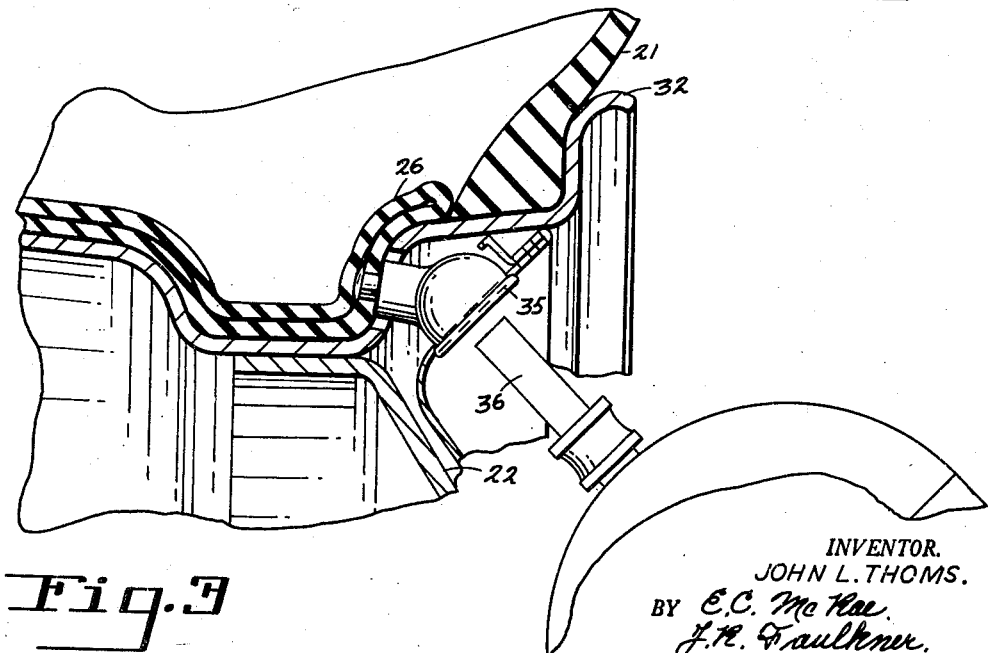
Figure 2 is a cross-section at 2—2 of Figure 1, with a compressed air container juxtaposed to the valve leading to the inner tire construction.
Figure 2:
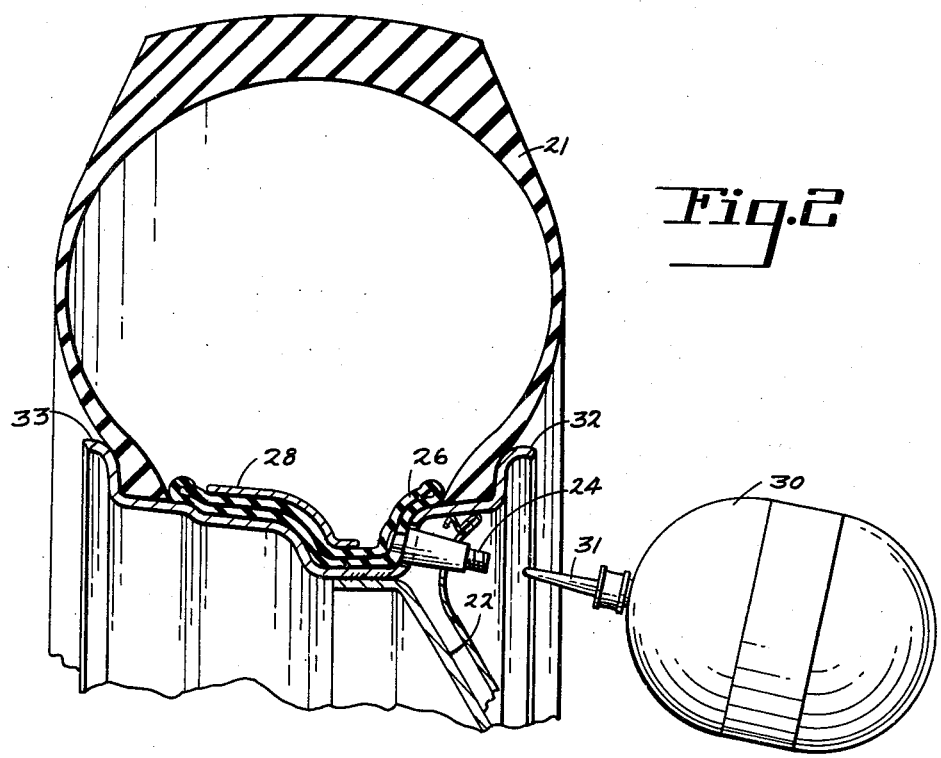

In Figure 2 the inner tire member 26 is seen in its position during normal tire operation. Retainer band 28 is seen placed about member 26 so that upon rotation of wheel 21, excessive movement of member 26 will be prevented. Compressed air container 30, with insertion needle 31 is shown in a position just before it is inserted into valve 24.

Tire 21 is a standard tubeless tire with its edges hermetically sealed to rim 32, 33 of wheel 22. Valve 25 is a standard valve and communicates with the space enclosed by tire 21. Valve 24, as best seen in Figure 2, communicates directly with member 26. In this embodiment, member 26 can be inflated only through valve 24. Member 26 is deflated throughout normal tire operation, thereby preserving and protecting it for use when failure of the tire 21 occurs. While retainer band 28 is shown in Figure 2, the retaining function provided by member 28 may be done by partially inflating member 26, so that during normal tire operation, member 26 will not move excessively in the space enclosed by tire 21. Another way of restraining member 26 would be to glue or otherwise adhere one side of member 26 to the circumference of wheel 22. It is also possible to have member 26 sufficiently elastic so that no external aid is needed to retain it.

After failure of tire 21, member 26 is inflated so that the tire construction is repaired well enough to drive the motor vehicle to a repair station where the wheel and tire assembly can be repaired or temporarily replaced while the defective tire is being repaired. After tire failure, which may be caused by any of the known tire hazards, the operator brings his vehicle to a halt and inflates the tire member with a compressed gas container 30 or from another gas or air supply. Any retaining members such as band 28 would be dislodged, burst or otherwise disposed of. The tire is then repaired at least to an extent to provide enough tire strength to allow propelling of the vehicle to a service station where the necessary repairs can be effected. The construction and material of member 26 may take on various forms depending upon the length and kind of support that it would be desirable to give to the tire construction. If the more severe hazards are to be protected against, then it will be necessary to put a stronger material in member 26. If simple punctures or other minor tire failures are to be guarded against, then a less substantial material may be used. If this latter material is used, it may be necessary to extract the puncture-causing object or else it may also puncture member 26. If a puncture sealing material were used, additional protection would be offered.

In order to protect against inflation of the wrong tire member by either the motor vehicle operator, service station attendant or other person, means are provided to differentiate between the valves leading to the inner and outer tire members. One way to do this would be to simply provide different diameters of the valve members making the inner tire member valve of a larger diameter than the standard outer tire valve. This would make it impossible for anyone to use a standard tire inflation hose and nozzle to inflate the inner tire member and also the nozzle provided on the compressed air supply would be unfit for the valve for the outer tire member. Another way to differentiate between the valves would be to provide a valve construction, such as is shown in Figure 3, where inner tire valve 35 is much larger than the insertion nozzle 36 and valve 35 is adapted to receive nozzle 36. It can be seen that it would be difficult if not impossible to inflate the inner tire member through valve 35 with the standard tire inflation means used today because valve 35 is similar to the standard tire air hose nozzle and there are no projecting means from either to release the other.

If desired, a sealing material may be added to the compressed air in cylinder 30 so that upon filling the inner tire member any damage or potential harm may be averted. It is also an aspect of this invention to provide a compressed air supply in the tire assembly that would be released upon outer tire failure and automatically inflate the auxiliary tire member. Such a compressed air supply may be positioned on or near a wheel portion and be actuated by a mechanical or pneumatic release system sensitive to tire pressure decrease.

An additional feature of this invention is to provide a compressed gas cylinder with a pressure which will give exactly the desired degree of inflation to the inner tire member so that neither under nor overinflation will endanger tire operation. The inner tire pressure will vary with the degree of its wall strength and other conditions.

It will be understood that the invention is not to be limited to the exact construction shown and described, but that various changes and modifications may be made without departing from the spirit and scope of the invention as defined in the appended claims.

What is claimed is:

1. In a motor car road wheel construction including a tubeless tire mounted upon a supporting rim having valve means for inflating the tire, that improvement comprising an inner, emergency, inflatable, normally deflated, tubular, air tight member circumferentially positioned upon said rim within said tire, separate valve means extending through said rim and opening into said member for inflating said member, said member possessed of sufficient strength when inflated to support one road wheel of a motor car, a frangible, circumferential retainer band positioned over said member for restraining the movement thereof with respect to the rim, said band adapted to break upon the inflation of said member.

2. In a motor car road wheel construction including a tubeless tire mounted upon a supporting rim, that improvement comprising an inner, emergency, inflatable, normally deflated, tubular, air tight member circumferentially positioned upon said rim within said tire, valve means extending through said rim and opening into said member for inflating said member, said member possessed of sufficient strength when inflated to support one road wheel of a motor car, a frangible, circumferential retainer band positioned over said member for restraining the movement thereof with respect to the rim, said band adapted to break upon the inflation of said member.

References Cited in the file of this patent
UNITED STATES PATENTS

| | | |
|---|---|---|
| 917,958 | Magowan | Apr. 13, 1909 |
| 1,377,782 | Mori | May 10, 1921 |
| 1,574,611 | Dembek | Feb. 23, 1926 |
| 2,608,235 | Wyman | Aug. 26, 1952 |